July 15, 1930. G. C. McCASKILL 1,770,418
SEVEN-TOOL COMBINATION
Filed Sept. 4, 1928
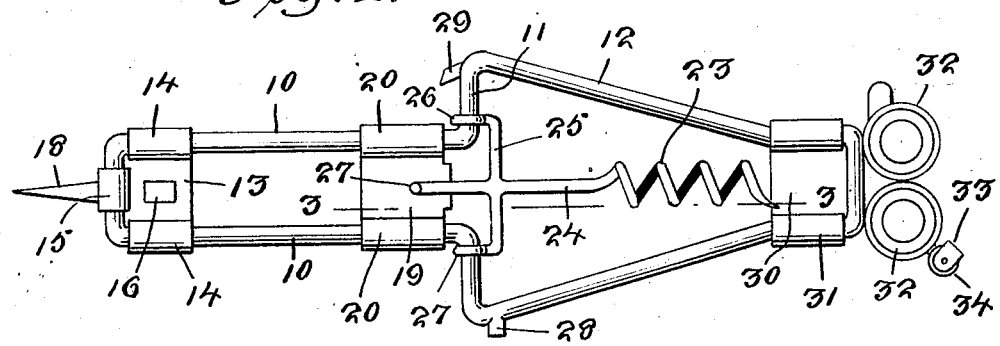
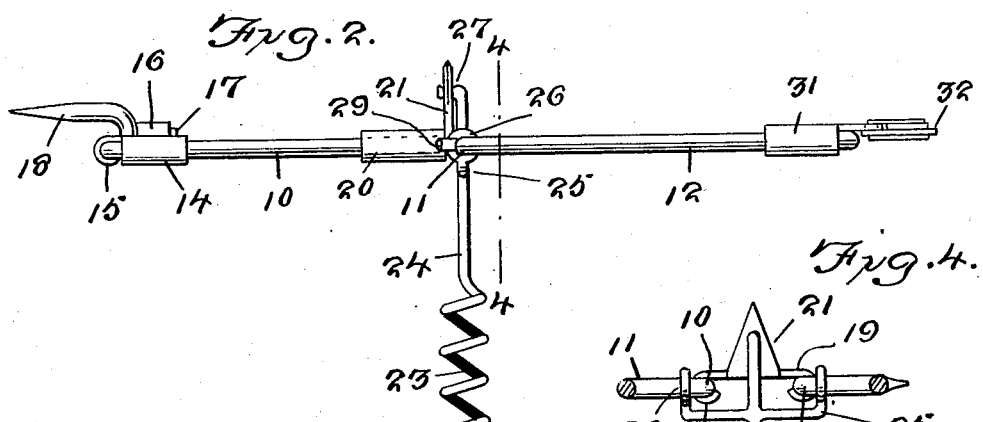
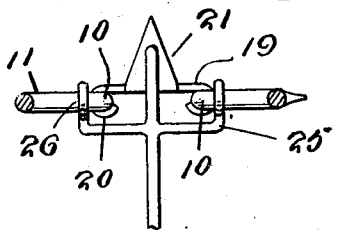
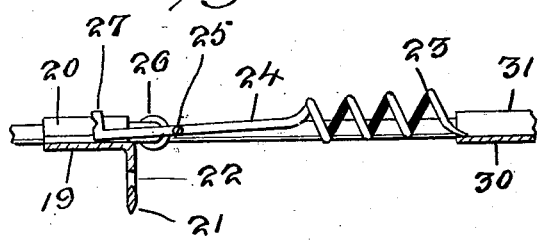
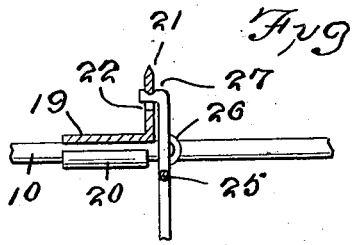
G. C. McCaskill
INVENTOR
BY Victor J. Evans
ATTORNEY Patented July 15, 1930

1,770,418

UNITED STATES PATENT OFFICE

GROVER C. McCASKILL, OF HUTCHINSON, KANSAS

SEVEN-TOOL COMBINATION

Application filed September 4, 1928. Serial No. 303,778.

This invention relates to combination tools, and contemplates a novel construction and arrangement of parts, the production of a tool having a wide range of various uses, while the tool in its entirety is comparatively small and capable of being conveniently used for any of its various purposes.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views, and wherein:—

Figure 1 is a plan view of the tool forming the subject matter of the present invention.

Figure 2 is a side elevation.

Figure 3 is a sectional view on line 3—3 of Figure 1.

Figure 4 is a sectional view on line 4—4 of Figure 2.

Figure 5 is a fragmentary sectional view showing how the cork-screw is held against pivotal movement when in position for use.

The tool forming the subject matter of the present invention comprises a main frame preferably constructed of wire including opposed parallel portions 10 which are off-set as at 11 and then extended in converging relation as at 12. Arranged at one end of the frame is a plate 13 the edges of which are looped about the parallel portions 10, while one end of the plate is looped about the cross piece of the frame as clearly illustrated in Figures 1 and 2, the first mentioned loops being indicated at 14 and the last mentioned loops being indicated at 15.

The center of the plate 13 is stamped to provide a clamp 16 which embraces the shank 17 of a pointed prong 18, the latter being capable of use as a milk bottle opener, also capable of being used as a can opener in a manner to be hereinafter described.

A second plate 19 is arranged between the parallel portions 10 and has its edges looped about said portions as at 20, this plate being capable of sliding movement on the portions 10 of the frame, one end of the plate is off-set to provide a pointed projection 21. This projection 21 is also provided with a central opening 22 for a purpose to be hereinafter described, the projection itself being used in conjunction with the prong 18 of a can opener, in other words the prong 18 is adapted to penetrate the center of the can to be opened, serving as a pivot for the tool, while the pointed projection 21 penetrates the top of the can adjacent the edge thereof and severs the top from the can as the tool is moved about its pivot.

A cork-screw is indicated at 23 and includes a shank 24 on the opposite sides of which project arms 25, these arms terminating in eyes 26 which receive the off-set extremities 11 of the members 10 of the frame as shown in Figure 1. By reason of this construction the cork-screw pivots upon the off-set extremities 11 so as to lie in a plane parallel with the frame when swung to a position at a right angle thereto for use as illustrated in Figure 2.

The shank 24 of the cork-screw has its free end bent at a right angle as at 27 and this portion is notched, so that when the cork-screw is swung to a position at a right angle to the frame, the right angular extremity 27 is received by the opening 22 of the pointed projection 21, this arrangement being clearly illustrated in Figure 5 and used to prevent the cork-screw moving upon the frame when swung to a position for use.

Projecting from one of the diverging portions 12 of the frame is a screw driver 28, while projecting from one of the off-set extremities 11 above referred to, is an angular extension 29 which serves as a beer bottle opener.

Arranged at the opposite end of the tool is a plate 30 having its edges looped about the frame as at 31, this plate being extended beyond the end of the tool and provided with openings in which are journaled a pair of grinding wheels 32 arranged for use as a knife or scissors sharpener, the blade to be sharpened being of course, placed between the wheels as will be readily understood. Also projecting from one extremity of this plate beyond the periphery of the adjacent wheel 32 is a U-shaped bracket 33 in which is journaled a small wheel 34 used as a glass cutter. It is manifest from an inspection of the drawings that these various parts are so mounted upon the main frame of the tool, that the tool in its entirety is comparatively small, and can be very quickly and conveniently handled for use in any of its various capacities.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

1. A tool of the character described comprising a frame formed from a single length of wire and including spaced parallel portions terminally offset and extended to provide diverging portions, plates supported by the parallel portions and including a rightangularly disposed extension having an opening therein, a cork-screw pivotally supported by the offset extremity and capable of being arranged in a plane with the frame or at a right angle thereto, and an angularly disposed end portion formed on the cork-screw and adapted to be received by said opening when the cork-screw is arranged at a right angle to the frame.

2. A tool of the character described comprising a frame formed from a single length of wire and including spaced parallel portions terminally offset and extended to provide diverging portions, a plate supported by said parallel portions and including a rightangularly disposed apertured extension, a cork-screw including a shank, arms projecting laterally therefrom and terminating to form eyes pivotally supporting the cork-screw on the offset portions of the frame, whereby the cork-screw can be arranged in a plane with the frame or at a right angle thereto, and an angular end portion formed on the shank and adapted to be received by said opening when the cork-screw is arranged at a right angle to the frame.

3. A tool of the character described comprising a frame formed from a single length of wire and including spaced parallel portions terminally offset, and extended to provide diverging portions, plates supported by the parallel portions and also the diverging portions, a rightangularly disposed extension formed on the plate supported by the parallel portions and having an opening therein, a cork-screw pivotally supported by the offset portions of the frame and having one end adapted to repose upon the plate supported by the diverging portions, to maintain the cork-screw in a plane with the frame, said cork-screw being capable of being swung to a rightangular position with relation to the frame, and an angularly disposed extremity formed on the cork-screw and adapted to be received by the said opening when the cork-screw is arranged in position for use.

In testimony whereof I affix my signature.

GROVER C. McCASKILL.